United States Patent

[11] 3,609,672

[72] Inventor Lewis H. Bossert
 El Cajon, Calif.
[21] Appl. No. 845,444
[22] Filed July 28, 1969
[45] Patented Sept. 28, 1971
[73] Assignee The United States of America as represented by the Secretary of the Navy

[54] FALSE ALARM INHIBIT CIRCUIT IN ECHO RANGING SYSTEMS
 3 Claims, 3 Drawing Figs.
[52] U.S. Cl. .................................................. 340/3 R, 340/5 R, 343/5 DP
[51] Int. Cl. .................................................. G01s 9/66
[50] Field of Search .................................................. 340/3, 5; 343/5 DP, 7 RS, 17.1

[56] References Cited
UNITED STATES PATENTS
3,320,576 5/1967 Dixon et al. .................. 340/5

Primary Examiner—Richard A. Farley
Attorneys—Joseph C. Warfield, Jr., George J. Rubens, John W. McLaren and Truman L. Styner ABSTRACT: Two or more filters with narrow side-by-side passbands will each pass broadband noise voltages but only one filter can pass a useful narrowband signal. An exclusive OR gate will pass a single filter output but will block simultaneous noise outputs thus effectively distinguishing between useful signals and false alarms.

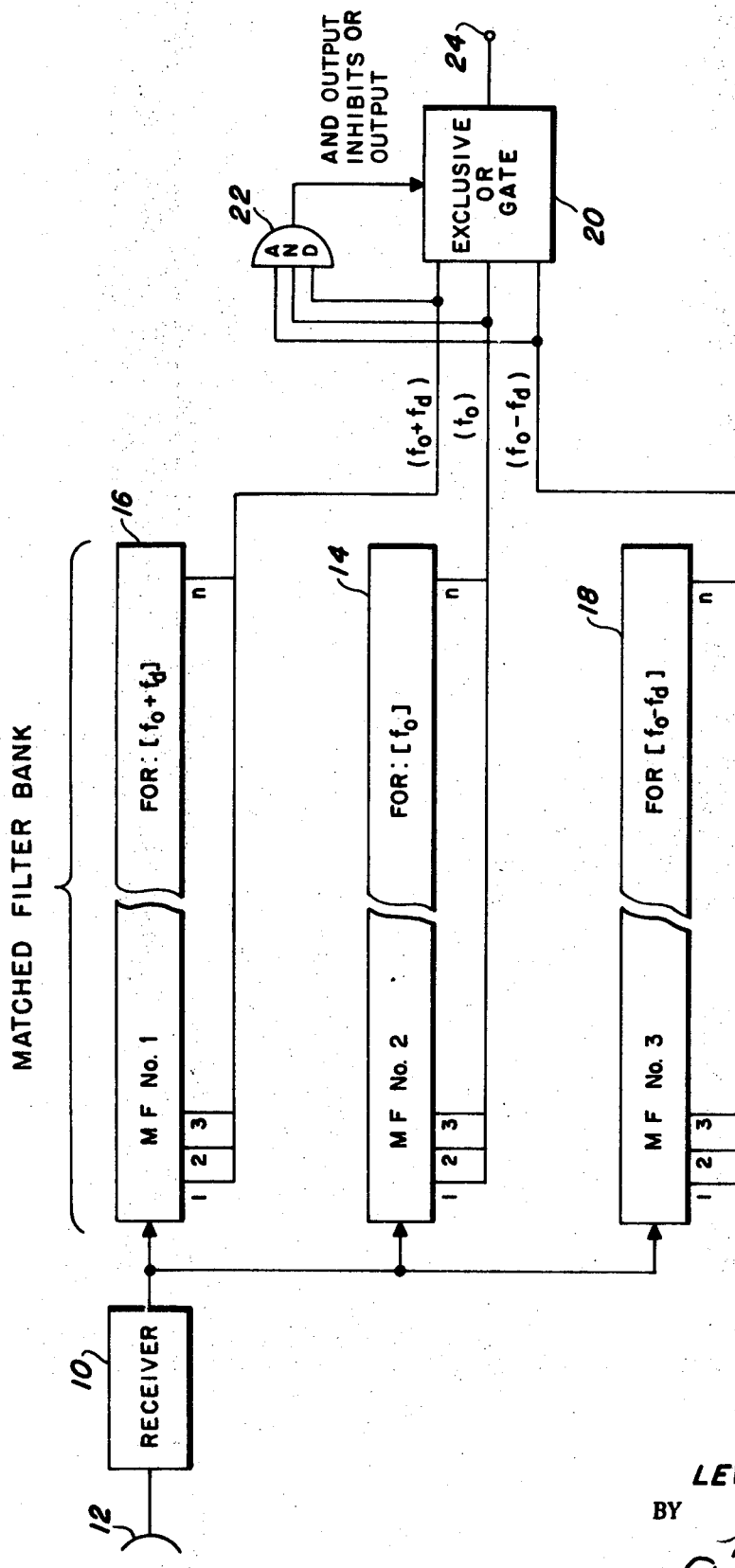

3,609,672

FALSE ALARM INHIBIT CIRCUIT IN ECHO RANGING SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In most sonar, radar and communications receivers, a signal voltage threshold is established above which all signal voltages are classed as legitimate signals and below which all signal voltages are classed as noise. In a receiver where the signal-to-noise ratio is unfavorable, and where sensitivity is important, the threshold is usually established as close to the noise level as possible and still effectively discriminate between random noise and true signals. Any strong random signal appearing above the threshold which is not a true signal must be classified as a false alarm. In general, the threshold level is related to the maximum false alarm rate acceptable in the particular system of interest.

The object of this invention is to provide an improved receiver which will effectively discriminate between useful signals and false alarm signals of the same frequency.

SUMMARY OF THE INVENTION

The objects of this invention are attached by providing two or more filters with narrow side-by-side passbands. Each filter will pass the basic carrier frequency of the system or closely adjacent doppler shifted components thereof, but the broadbands of noise voltages will pass simultaneously through some or all of the filters. An exclusive OR gate connected to the output of all of the filters, will pass a single filter output but will block simultaneous noise voltages at the outputs of the several filters.

Other objects and features of this invention will become apparent to those skilled in the art by referring to the preferred embodiments described in the following specification and illustrated in the accompanying drawing in which the block diagram illustrates the essential elements of the preferred embodiment.

At 10 in the drawing is shown a receiver for receiving, amplifying and filtering sonar, radar, telemetry or other communication signals picked up at the antenna or transducer 12. Automatic gain control and/or a limiting function is performed in the receiver to substantially level the signals.

In the case of active radar or sonar, pulses of locally generated frequencies, $f_o$, are transmitted outward to the field to be interrogated. Echo signals reflected from distant objects are sensed by the sensor 12 and are employed to identify the object as well as determine the range of the target. The frequency of the received signal, however, might vary slightly from the frequency of the outgoing or interrogating signal because of relative motion between the target object and the receiver 10, or because of reverberations or variations of the paths taken by the outgoing and incoming signals. Variable skip distance of radio signals or erratic surface and bottom bounce for sonar signals will cause a doppler shift, $f_d$, of the received frequencies. The upward doppler shift and the downward doppler shift will result, respectively, in $f_o+f_d$, and $f_o-f_d$ at the receiver.

According to an important feature of this invention, the three narrowband filters 14, 16 and 18 are coupled in parallel to the output of the receiver to pass, respectively, the center or basic frequency, $f_o$, and the upper and lower doppler shifts. Where closely adjacent narrowbands are to be separated it is preferred that matched filters be employed at 14, 16, and 18. Such filters may be of the type illustrated, for example, in the Erickson U.S. Pat. No. 3,249,940 where a delay line with a series of lumped inductances are connected at spaced points to inverters to produce a series of coded plus ones and minus ones at the output of the filter as a received pulse progresses from one end of the delay line to the other. The outgoing and received series of plus ones and minus ones can be cross correlated to retrieve signals buried deep in noise.

A received echo signal will normally be expected to pass either filter 14 at frequency $f_o$ or be shifted upwardly or downwardly and passed through filter 16 or 18. In any case the useful signal would appear only at the output of one of the filters.

Noise pulses, however, are usually broadbanded and any noise pulse which exceeds the threshold of the receiver will contain component frequencies within all three bands $f_o, f_o+f_o$, and $f_o-f_d$.

The logic circuit shown in the right hand portions of the FIGURE takes advantage of this bandwidth difference between the noise and the useful signal. The exclusive OR gate 20 is connected between the output terminal 24 and the output of each of the filters so that a signal at the output of only one of the filters will occur at the output terminal 24. If, however, a signal appears simultaneously, or nearly simultaneously, at two or more outputs and hence at the input of AND gate 22, the OR gate 20 is disabled to prevent passage of any signal. Hence, the ratio of false alarm to useful signals is materially reduced.

Obviously many modifications and variations of the present invention are possible in the light of the above teachings. It is therefore to be understood that within the scope of the appended claims the invention may be practiced otherwise than as specifically described.

What is claimed is:

1. A false alarm inhibit circuit in an echo ranging system, said circuit comprising:

a plurality of narrow passband filters connected in parallel to the output of an echo receiver, and being responsive, respectively, to frequencies equal to and slightly removed from the transmitted frequency, $f_o$, of said system so that one only of said filters will pass said transmitted frequency but all filters can pass broadband noise, a logical exclusive OR gate circuit coupled to the outputs of said filters, means responsive to all said outputs for disabling said gate when signal voltages occur simultaneously on all said outputs and for enabling said gate when a signal voltage occurs on one only of said outputs.

2. In the false alarm inhibit circuit defined in claim 1, said filters comprising matched filters resonant, respectively, to $f_o, f_o+f_d$, and $f_o-f$, wherein $f_d$ comprises a doppler shift frequency component.

3. In the false alarm inhibit circuit defined in claim 1; said means comprising an AND gate with plural inputs connected and responsive to the outputs of all of said filters and a single output connected to said OR gate to produce an inhibiting pulse which disables said OR gate.